(12) United States Patent
Dai et al.

(10) Patent No.: US 8,340,037 B2
(45) Date of Patent: Dec. 25, 2012

(54) METHODS AND APPARATUSES FOR GENERATING AND PARSING CONTINUOUS RESOURCE ALLOCATION SIGNALING

(75) Inventors: Bo Dai, Shenzhen (CN); Shuqiang Xia, Shenzhen (CN); Guanghui Yu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 416 days.

(21) Appl. No.: 12/674,677

(22) PCT Filed: Dec. 24, 2007

(86) PCT No.: PCT/CN2007/003747
§ 371 (c)(1),
(2), (4) Date: Feb. 22, 2010

(87) PCT Pub. No.: WO2009/043208
PCT Pub. Date: Apr. 9, 2009

(65) Prior Publication Data
US 2011/0122830 A1 May 26, 2011

(30) Foreign Application Priority Data
Sep. 29, 2007 (CN) .......................... 2007 1 0181060

(51) Int. Cl.
*H04W 4/00* (2009.01)
*H04J 1/00* (2006.01)
*H04L 27/28* (2006.01)
*H04B 7/02* (2006.01)
*H04B 7/00* (2006.01)

(52) U.S. Cl. ........ 370/329; 370/330; 370/343; 375/260; 375/267; 455/509

(58) Field of Classification Search .......... None
See application file for complete search history.

(56) References Cited

FOREIGN PATENT DOCUMENTS
CN 1430366 A 7/2003
(Continued)

OTHER PUBLICATIONS

English Translation of the Written Opinion of the International Search Authority in international application No. PCT/CN2007/003747, mailed on Jul. 10, 2008.
(Continued)

*Primary Examiner* — Yemane Mesfin
*Assistant Examiner* — Samina Choudhry
(74) *Attorney, Agent, or Firm* — Oppedahl Patent Law Firm LLC

(57) ABSTRACT

A method for generating continuous resource allocation signaling comprises: a sender determines a value of the total number of resource blocks $N_{RB}$ in a system according to the total resource number in the system and determines, according to the amount and location of the total resources occupied by the continuous resources allocated to the target user equipment, the number of continuous resource blocks allocated to the user equipment $L_{CRBs}$ and the value of the index number of the starting resource block $RB_{start}$ in the continuous resource blocks allocated to the user equipment; the sender compares $L_{CRBs}-1$ with $\lfloor N_{RB}/2 \rfloor$ to compute the value RIV of the resource allocation signaling of the user equipment; if the $L_{CRBs}-1$ is greater than the $\lfloor N_{RB}/2 \rfloor$, then the RIV is $N_{RB}(N_{RB}-L_{CRBs}+1)+(N_{RB}-1-RB_{start})$; else the RIV is $N_{RB}(L_{CRBs}-1)+RB_{start}$; and the resource allocation signaling of the target user equipment is generated according to RIV and transmitted. An apparatus for generating continuous resource allocation signaling, and a method and an apparatus for parsing continuous resource allocation signaling, are also disclosed. The present invention ensures that under any resource allocation situation the overhead for resource allocation signaling is always $$\mathrm{ceil}\left(\log_2 \frac{N \cdot (N+1)}{2}\right).$$

8 Claims, 3 Drawing Sheets

FOREIGN PATENT DOCUMENTS

| | | |
|---|---|---|
| WO | 2006046889 A1 | 5/2006 |
| WO | 2007019567 A2 | 2/2007 |

OTHER PUBLICATIONS

International Search Report in international application No. PCT/CN2007/003747, mailed Jul. 10, 2008.

Supplementary European Search Report in European application No. 07846009.4, mailed on May 22, 2012.

DL Unicast Resource Allocation Signalling using L1L2 control channels Jun. 20, 2007.

E-mail discussion summary on downlink control Signalling Aug. 20, 2007.

Notification of the First Office Action of Chinese application No. 200710181060.8, issued on Jun. 12, 2009.

US 8,340,037 B2

METHODS AND APPARATUSES FOR GENERATING AND PARSING CONTINUOUS RESOURCE ALLOCATION SIGNALING

TECHNICAL FIELD

The present invention relates to a resource allocation technology in broadband carrier systems, and more particularly relates to methods and apparatuses for generating and parsing continuous resource allocation signaling.

BACKGROUND

In existing technologies, there are primarily two methods for physical channel resource allocation, one is a method of localization, and the other is a method of distribution. The localization method is to divide the entire channel into several resource blocks, each of which is composed of continuous sub-carriers. The distribution method is to distribute data in each user equipment over the entire time-frequency surface.

The technology based on Orthogonal Frequency Division Multiple Access (OFDMA) is one of the major alternative schemes for future wireless communication technologies. The scheme allocates several different sub-carriers to different user equipments, and these sub-carriers are allowed to overlap in a frequency domain but always remain orthogonal to each other. A major disadvantage of the OFDMA is that it has a higher peak to average power ratio, which may cause the power amplifier efficiency to reduce significantly. In order to overcome this disadvantage and at the same time also to be able to inherit the advantages of the OFDMA, an uplink of a 3GPP Long Term Evolution (LTE) system adopts a single carrier technology, DFT-s-OFDMA technology, i.e. user data go through a DFT precoder first, and the output value transformed by the DFT is localized over the sub-carriers of the OFDMA. Although quite sensitive to frequency offset just like the OFDMA technology, the DFT-s-OFDMA technology offers a lower peak to average power ratio than the OFDMA technology and provides a pretty good result in resistance against multipath time delay.

For a certain system bandwidth, suppose that there are a total of N resource blocks and each resource block contains 12 sub-carriers, resource allocation information contains two parameters: a logical index number of a starting resource block and the number of resource blocks allocated continuously, and these two parameters are denoted by letters O and P respectively. Corresponding control signaling is required to be capable of indicating all possible (O,P) combinations.

A conventional method is to use two binary numbers to denote O and P respectively, while signaling overhead required is ceil($\log_2 N^2$). However, actually, there are only a total of $$\frac{N(N+1)}{2}$$

possibilities for (O,P) combinations, in order to reduce the control signaling overhead, a tree-based resource allocation method is proposed, and the corresponding signaling overhead is $$\text{ceil}\left(\log_2 \frac{N \cdot (N+1)}{2}\right).$$

Moreover, the method provides a formula for generating the corresponding resource allocation signaling, shown as below:

if $(L_{CRBs}-1) \leq \lceil N_{RB}/2 \rceil$, then $RIV = N_{RB}(L_{CRBs}-1) + RB_{start}$, else, $RIV = N_{RB}(N_{RB}-L_{CRBs}+1) + (N_{RB}-1-RB_{start})$.

Wherein, the $L_{CRBs}$ denotes the number of allocated continuous resource blocks P, the $RB_{start}$ denotes the logical index number of the starting resource block of the allocated resources O, the $N_{RB}$ denotes the number of resource blocks in the current system, and the RIV denotes the decimal value of the resource allocation signaling.

When allocating 1 resource block in 5 resource blocks, there are 5 allocation cases; when allocating 2 continuous resource blocks, there are 4 allocation cases, and so forth; when allocating 5 resource blocks, there is 1 allocation case, therefore there are a total of 5+4+3+2+1=15 allocation cases, and the signaling overhead is $$\text{ceil}\left(\log_2 \frac{5(5+1)}{2}\right) = 4, \text{ i.e.}$$

it is necessary to use a 4-bit binary number to denote all allocation cases. However, according to the above formula, when the $N_{RB}$ is 5, the $L_{CRBs}$ is 4 and the $RB_{start}$ is 1, because $(4-1) = \lceil 5/2 \rceil$, the value RIV of the resource allocation signaling calculated using the formula is 16, and it is necessary to use a 5-bit binary number to denote. But actually, there are only 15 possibilities for the denotation of the signaling, it suffices to use a 4-bit binary number to denote them all.

SUMMARY

The technical issue that the present invention is intended to address is, by providing methods and apparatuses for generating and parsing continuous resource allocation signaling, to ensure that the overhead of resource allocation signaling is always $$\text{ceil}\left(\log_2 \frac{N \cdot (N+1)}{2}\right)$$

under any resource allocation situation.

In order to solve the above problem, the present invention provides a method for generating continuous resource allocation signaling, which comprises the following steps:

step S01, a sender determines a value of a parameter $N_{RB}$ according to the total number of resources in a system and determines, according to the amount and location of the total resources occupied by continuous resources allocated to a target user equipment, values of parameters $L_{CRBs}$ and $RB_{start}$, wherein, the $N_{RB}$ denotes the total number of resource blocks in the system, the $L_{CRBs}$ denotes the number of continuous resource blocks allocated to the user equipment, and the $RB_{start}$ denotes an index number of a starting resource block in the continuous resource blocks allocated to the user equipment;

step S02, the sender compares $L_{CRBs}-1$ with $\lfloor N_{RB}/2 \rfloor$ to compute a value RIV of resource allocation signaling of the user equipment, if the $L_{CRBs}-1$ is greater than the $\lfloor N_{RB}/2 \rfloor$, then the RIV is $N_{RB}(N_{RB}-L_{CRBs}+1)+(N_{RB}-1-RB_{start})$ or $N_{RB} \times N_{RB} - N_{RB} \times L_{CRBs} + N_{RB} \times 2 - 1 - RB_{start}$;

else, the RIV is $N_{RB}(L_{CRBs}-1)+RB_{start}$; and step S03, the resource allocation signaling of the target user equipment is generated according to the RIV and transmitted.

Furthermore, the step S03 may be intended to convert the value RIV of the resource allocation signaling from a decimal number to a binary number so as to generate the resource allocation signaling of the target user equipment.

In order to solve the above problem, the present invention also provides an apparatus for generating continuous resource allocation signaling, which, residing on a sender, comprises:

a parameter value determination and calculation unit, which is used to determine a value of a parameter $N_{RB}$ according to the total number of resources in a system and to determine, according to the amount and location of the total resources occupied by continuous resources allocated to a target user equipment, values of parameters $L_{CRBs}$ and $RB_{start}$, and to compute values of $L_{CRBs}-1$ and $\lfloor N_{RB}/2 \rfloor$ and to transmit the computed values along with the parameter values to a comparison unit, wherein, the $N_{RB}$ denotes the total number of resource blocks in the system, the $L_{CRBs}$ denotes the number of continuous resource blocks allocated to the user equipment, and the $RB_{start}$ denotes an index number of a starting resource block in the continuous resource blocks allocated to the user equipment;

the comparison unit, which is used to compare the $L_{CRBs}-1$ with the $\lfloor N_{RB}/2 \rfloor$, and to transmit the result of the comparison along with the parameter values to a calculation unit;

the calculation unit, which is used to calculate a value RIV of resource allocation signaling of the user equipment according to the result of the comparison and by using a relevant formula, and to transmit the calculated RIV to a resource allocation signaling transmission unit, wherein the calculation method is configured as below:

if the result of the comparison shows the $L_{CRBs}-1$ is greater than the $\lfloor N_{RB}/2 \rfloor$, then the value RIV of the resource allocation signaling is $$N_{RB}(N_{RB}-L_{CRBs}+1)+(N_{RB}-1-RB_{start}) \text{ or } N_{RB} \times N_{RB} - N_{RB} \times L_{CRBs} + N_{RB} \times 2 - 1 - RB_{start},$$

else, the RIV is $N_{RB}(L_{CRBs}-1)+RB_{start}$; and the resource allocation signaling transmission unit, which is used to generate the resource allocation signaling of the target user equipment according to the value RIV of the resource allocation signaling obtained via calculation and to transmit it.

Furthermore, the resource allocation signaling transmission unit may be also used to convert the value RIV of the resource allocation signaling from a decimal number to a binary number so as to generate the resource allocation signaling of the target user equipment.

In order to solve the above problem, the present invention also provides a method for parsing continuous resource allocation signaling, which comprises the following steps:

step S11, a user equipment receives resource allocation signaling sent to it from a sender and obtains a value RIV of the resource allocation signaling;

step S12, comparing $$\left\lfloor \frac{RIV}{N_{RB}} \right\rfloor + 1 + RIV \bmod N_{RB}$$

with $N_{RB}$, if the $$\left\lfloor \frac{RIV}{N_{RB}} \right\rfloor + 1 + RIV \bmod N_{RB}$$

is greater than the $N_{RB}$, then the number of continuous resource blocks allocated to the user equipment $L_{CRBs}$ is $$N_{RB} + 2 - \left( \left\lfloor \frac{RIV}{N_{RB}} \right\rfloor + 1 \right),$$

and an index number of a starting resource block $RB_{start}$ is $N_{RB}-1-RIV \bmod N_{RB}$, else, the $L_{CRBs}$ is $$\left\lfloor \frac{RIV}{N_{RB}} \right\rfloor + 1,$$

and the $RB_{start}$ is $RIV \bmod N_{RB}$, wherein, the $N_{RB}$ denotes the total number of resource blocks in a system, the $L_{CRBs}$ denotes the number of the continuous resource blocks allocated to the user equipment, and the $RB_{start}$ denotes the index number of the starting resource block in the continuous resource blocks allocated to the user equipment; and step S13, the user equipment acquires, according to the values of $L_{CRBs}$ and $RB_{start}$, the amount and location of the total resources occupied by the continuous resources allocated to itself.

Furthermore, in the step S11, the user equipment may detect out its own resource allocation signaling from the sender's transmitted data, and convert the resource allocation signaling received from a binary number to a decimal number so as to obtain the value RIV of the resource allocation signaling.

In order to solve the above problem, the present invention also provides an apparatus for parsing continuous resource allocation signaling, which, residing on a user equipment, comprises:

a resource allocation signaling receiving unit, which is used to receive resource allocation signaling that a sender sends to the user equipment, and to transmit a value RIV of the resource allocation signaling obtained from the signaling to a parameter value determination and calculation unit;

the parameter value determination and calculation unit, which is used to determine a value of a parameter $N_{RB}$ according to the total number of resources in a system and to calculate values of $$\left\lfloor \frac{RIV}{N_{RB}} \right\rfloor + 1 \text{ and } RIV \bmod N_{RB},$$

and to transmit the computed result and the value of $N_{RB}$ to a comparison unit, wherein, the $N_{RB}$ denotes the total number of resource blocks in the system;

the comparison unit, which is used to compare the $$\left\lfloor \frac{RIV}{N_{RB}} \right\rfloor + 1 + RIV \bmod N_{RB}$$

with the $N_{RB}$, and to transmit the result of the comparison along with the parameter values to a calculation unit;

the calculation unit, which is used to calculate the number of continuous resource blocks allocated to the user equipment $L_{CRBs}$ and an index number of a starting resource block $RB_{start}$ according to the result of the comparison and by using a relevant formula, and to transmit the computed result to a resource allocation information acquisition unit, wherein the calculation method is configured as below:

if the $$\left\lfloor \frac{RIV}{N_{RB}} \right\rfloor + 1 + RIV \bmod N_{RB}$$

is greater than the $N_{RB}$, then the $L_{CRBs}$ is $$N_{RB} + 2 - \left( \left\lfloor \frac{RIV}{N_{RB}} \right\rfloor + 1 \right),$$

and the $RB_{start}$ is $N_{RB} - 1 - RIV \bmod N_{RB}$,
else, the $L_{CRBs}$ is $$\left\lfloor \frac{RIV}{N_{RB}} \right\rfloor + 1,$$

and the $RB_{start}$ is $RIV \bmod N_{RB}$; and the resource allocation information acquisition unit, which is used to acquire the amount and location of the total resources occupied by the continuous resources allocated to the user equipment according to the values of $L_{CRBs}$ and $RB_{start}$.

Furthermore, the resource allocation signaling receiving unit may be also used to convert the received resource allocation signaling from a binary number to a decimal number so as to obtain the value RIV of the resource allocation signaling.

The major advantages and features of the present invention include the following:

1. it can be guaranteed that, by adopting the scheme of the present invention for generating continuous resource allocation signaling, the actual overhead of resource allocation signaling is $$\operatorname{ceil}\left( \log_2 \frac{N \cdot (N+1)}{2} \right);$$

and 2. because the value of the continuous resource allocation signaling generated by using the technical scheme of the present invention is more compact, when the signaling overhead exactly covers all allocation cases, the continuous resource allocation signaling generated by the present invention can be more reasonable, and can avoid the problem in existing technologies that the actual overhead may exceed the predetermined value.

DETAILED DESCRIPTION

The main idea of the present invention is: converting $\lceil N_{RB}/2 \rceil$ in a calculation formula for a value RIV of resource allocation signaling in an existing tree-based resource allocation scheme to $\lfloor N_{RB}/2 \rfloor$, and providing a corresponding method for parsing the value RIV of the resource allocation signaling.

Suppose that there are a total of $N_{RB}$ resource blocks in a communication system, resource allocation information contains two parameters: the number of continuous resource blocks allocated to a user equipment and a logical index number of a starting resource block among these continuous resource blocks, if using letters $RB_{start}$ and $L_{CRBs}$ to represent these two parameters respectively, then a formula for calculating a value RIV of resource allocation signaling in the present invention is as below:

if $(L_{CRBs}-1) \leq \lfloor N_{RB}/2 \rfloor$, then $RIV = N_{RB}(L_{CRBs}-1) + RB_{start}$, else, $RIV = N_{RB}(N_{RB} - L_{CRBs} + 1) + (N_{RB} - 1 - RB_{start})$ or $RIV = N_{RB} \times N_{RB} - N_{RB} \times L_{CRBs} + N_{RB} \times 2 - 1 - RB_{start}$.

Accordingly, a formula for parsing the value RIV of the resource allocation signaling on a sender is as below:

$$a = \left\lfloor \frac{RIV}{N_{RB}} \right\rfloor + 1,$$

$b = RIV \bmod N_{RB}$ if $a + b > N_{RB}$, then, $L_{CRBs} = N_{RB} + 2 - a$, $RB_{start} = N_{RB} - 1 - b$, else, $L_{CRBs} = a$, $RB_{start} = b$.

Figure 1:
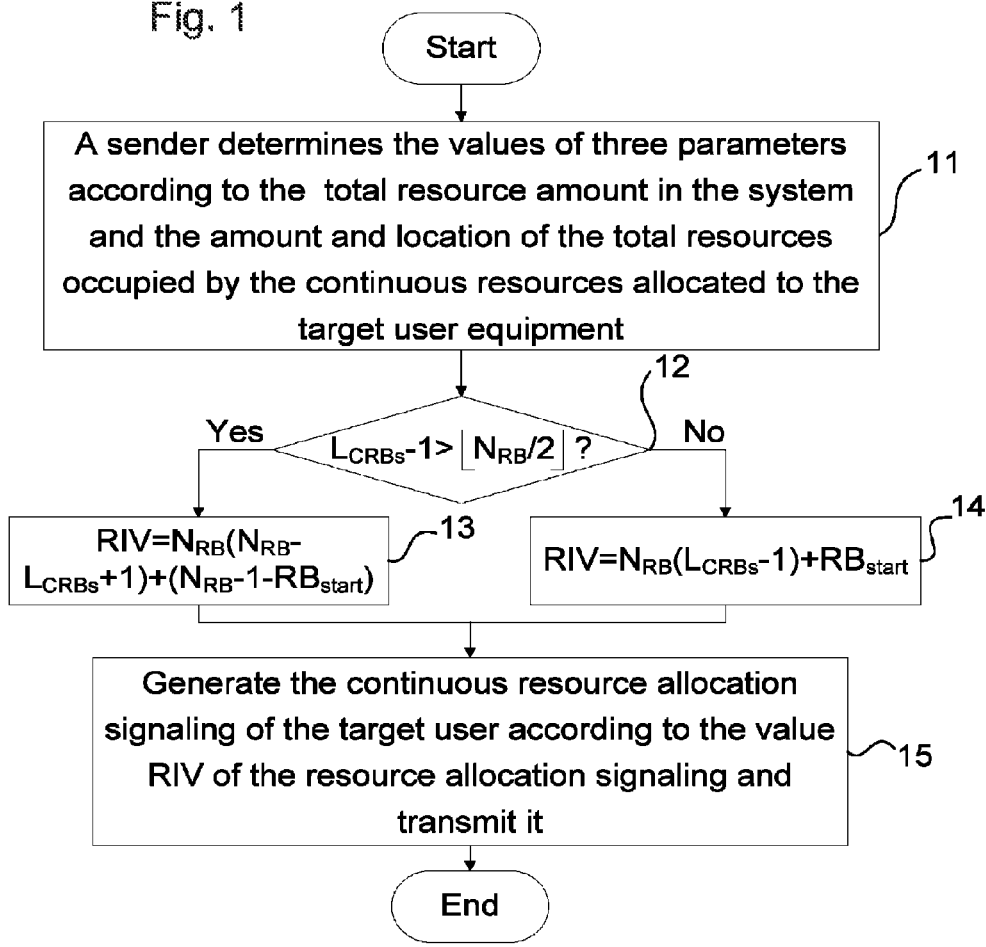
FIG. 1 is a flowchart of a method for generating continuous resource allocation signaling as described in an embodiment of the present invention.

The method for generating continuous resource allocation signaling as described in an example of the present invention is illustrated below with reference to FIG. 1. The specific process is as follows:

step 11, a sender determines a value of a parameter $N_{RB}$ according to the total number of resources in a system and determines, according to the amount and location of the total resources occupied by continuous resources allocated to a target user equipment, values of parameters $L_{CRBs}$ and $RB_{start}$;

step 12, comparing $L_{CRBs}-1$ with $\lfloor N_{RB}/2 \rfloor$, determining whether the $L_{CRBs}-1$ is greater than the $\lfloor N_{RB}/2 \rfloor$, if yes, then executing step 13, else executing step 14;

step 13, calculating a value RIV of resource allocation signaling, the RIV is $N_{RB}(N_{RB}-L_{CRBs}+1)+(N_{RB}-1-RB_{start})$ or $N_{RB} \times N_{RB}-N_{RB} \times L_{CRBs}+N_{RB} \times 2-1-RB_{start}$, then executing step 15;

step 14, calculating that the value RIV of the resource allocation signaling is $N_{RB}(L_{CRBs}-1)+RB_{start}$;

step 15, generating corresponding binary resource allocation signaling according to the value RIV of the resource allocation signaling, and transmitting the resource allocation signaling of the target user equipment.

Figure 2:
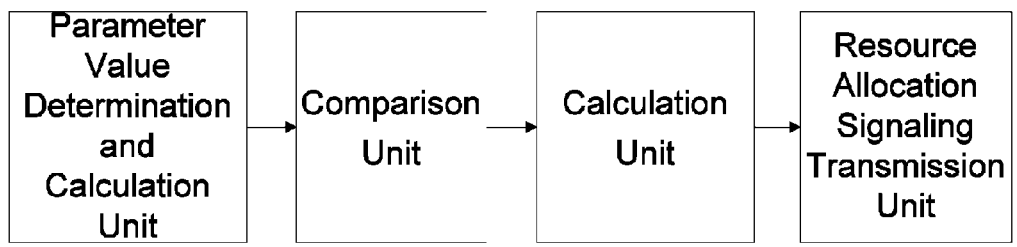
FIG. 2 is an illustration of the structure of an apparatus used to execute the method for generating continuous resource allocation signaling as shown in FIG. 1.

The apparatus used to execute the above method for generating continuous resource allocation signaling is shown in FIG. 2, which resides on the sender and comprises a parameter value determination and calculation unit, a comparison unit, a calculation unit and a resource allocation signaling transmission unit, wherein:

the parameter value determination and calculation unit is used to determine the value of the parameter $N_{RB}$ according to the total number of resources in the system and to determine, according to the amount and location of the total resources occupied by the continuous resources allocated to the target user equipment, the values of parameters $L_{CRBs}$ and $RB_{start}$, to compute the values of $L_{CRBs}-1$ and $\lfloor N_{RB}/2 \rfloor$ and to transmit the computed values along with the parameter values to the comparison unit;

the comparison unit is used to compare the $L_{CRBs}-1$ with the $\lfloor N_{RB}/2 \rfloor$, and to transmit the result of the comparison along with the parameter values to the calculation unit;

the calculation unit is used to calculate the value RIV of the resource allocation signaling according to the result of the comparison and by using a relevant formula, and to transmit the calculated value RIV to the continuous resource allocation signaling transmission unit, wherein the calculation method is configured as below:

if the result of the comparison shows the $L_{CRBs}-1$ is greater than the $\lfloor N_{RB}/2 \rfloor$, then the value RIV of the resource allocation signaling is $$N_{RB}(N_{RB}-L_{CRBs}+1)+(N_{RB}-1-RB_{start}) \text{ or } N_{RB} \times N_{RB} - N_{RB} \times L_{CRBs}+N_{RB} \times 2-1-RB_{start},$$

else, the RIV is $N_{RB}(L_{CRBs}-1)+RB_{start}$; and the resource allocation signaling transmission unit is used to generate the resource allocation signaling of the target user equipment according to the value of the resource allocation signaling obtained via calculation and to transmit it.

Figure 3:
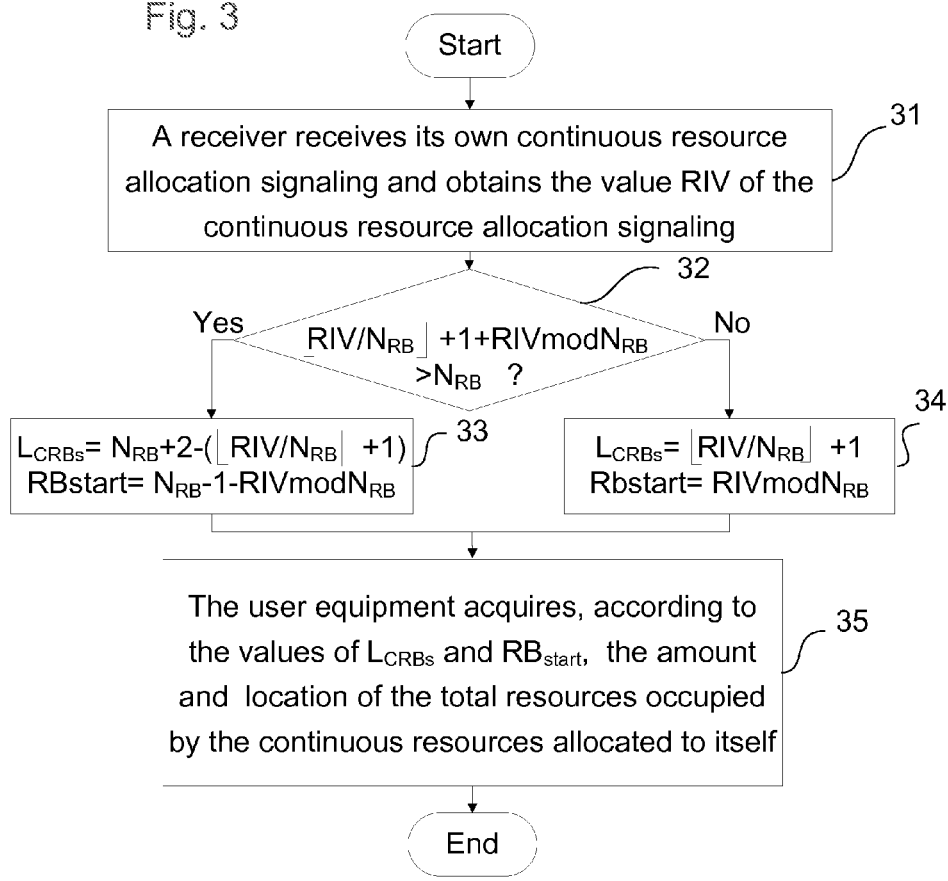
FIG. 3 is a flowchart of a method for parsing continuous resource allocation signaling corresponding to the generation method as shown in FIG. 1.

Accordingly, the method for parsing continuous resource allocation signaling as described in the embodiment is as shown in FIG. 3. The specific process is as below:

step 31, the user equipment detects out its own resource allocation signaling from the transmitted data of the sender, converts the received binary resource allocation signaling to a decimal value, and obtains the value RIV of the resource allocation signaling;

step 32, comparing $$\left\lfloor \frac{RIV}{N_{RB}} \right\rfloor + 1 + RIV \bmod N_{RB}$$

with $N_{RB}$, determining whether the $$\left\lfloor \frac{RIV}{N_{RB}} \right\rfloor + 1 + RIV \bmod N_{RB}$$

is greater than the $N_{RB}$, if yes, then executing step 33, else executing step 34;

step 33, calculating that the number of continuous resource blocks allocated to the user equipment $L_{CRBs}$ is $$N_{RB} + 2 - \left(\left\lfloor \frac{RIV}{N_{RB}} \right\rfloor + 1\right),$$

the logical index number of the starting resource block $RB_{start}$ among these continuous resource blocks is $N_{RB}-1-RIV \bmod N_{RB}$, then executing step 35;

step 34, calculating that the $L_{CRBs}$ is $$\left\lfloor \frac{RIV}{N_{RB}} \right\rfloor + 1,$$

and the $RB_{start}$ is $RIV \bmod N_{RB}$; and step 35, the user equipment acquires, according to the values of $L_{CRBs}$ and $RB_{start}$, the amount and location of the total resources occupied by the continuous resources allocated to itself.

Figure 4:
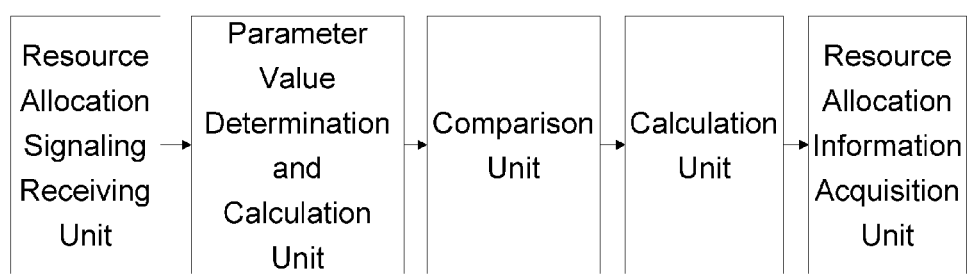
FIG. 4 is an illustration of the structure of an apparatus used to execute the method for parsing continuous resource allocation signaling as shown in FIG. 3.

The apparatus used to execute the above method for parsing continuous resource allocation signaling is shown in FIG. 4, which resides on the user equipment and comprises a resource allocation signaling receiving unit, a parameter value determination and calculation unit, a comparison unit, a calculation unit and a resource allocation information acquisition unit, wherein:

the resource allocation signaling receiving unit is used to receive the resource allocation signaling from the sender, and to transmit the value RIV of the resource allocation signaling obtained from the signaling to the parameter value determination and calculation unit;

the parameter value determination and calculation unit is used to determine the value of the parameter $N_{RB}$ according to the total number of resources in the system and to calculate the values of $$\left\lfloor \frac{RIV}{N_{RB}} \right\rfloor + 1$$

and $RIV \bmod N_{RB}$, and to transmit the computed result and the value of $N_{RB}$ to the comparison unit;

the comparison unit is used to compare $$\left\lfloor \frac{RIV}{N_{RB}} \right\rfloor + 1 + RIV \bmod N_{RB}$$

with the $N_{RB}$, and to transmit the result of the comparison along with the parameter values to the calculation unit;

the calculation unit is used to calculate the number of continuous resource blocks $L_{CRBs}$ and the logical index number of the starting resource block among these continuous resource blocks $RB_{start}$ according to the result of the comparison and by using a relevant formula, and to transmit the computed result to the resource allocation information acquisition unit, wherein the calculation method is configured as below:
if the $$\left\lfloor \frac{RIV}{N_{RB}} \right\rfloor + 1 + RIV \bmod N_{RB}$$

is greater than the $N_{RB}$, then the number of continuous resource blocks allocated to the user equipment $L_{CRBs}$ is $$N_{RB} + 2 - \left(\left\lfloor \frac{RIV}{N_{RB}} \right\rfloor + 1\right),$$

and the logical index number of the starting resource block $RB_{start}$ is $N_{RB} - 1 - RIV \bmod N_{RB}$,
else, the $L_{CRBs}$ is $$\left\lfloor \frac{RIV}{N_{RB}} \right\rfloor + 1,$$

and the $RB_{start}$ is $RIV \bmod N_{RB}$; and
the resource allocation information acquisition unit is used to acquire the amount and location of the total resources occupied by the continuous resources allocated to itself according to the values of $L_{CRBs}$ and $RB_{start}$.

Figure 5:
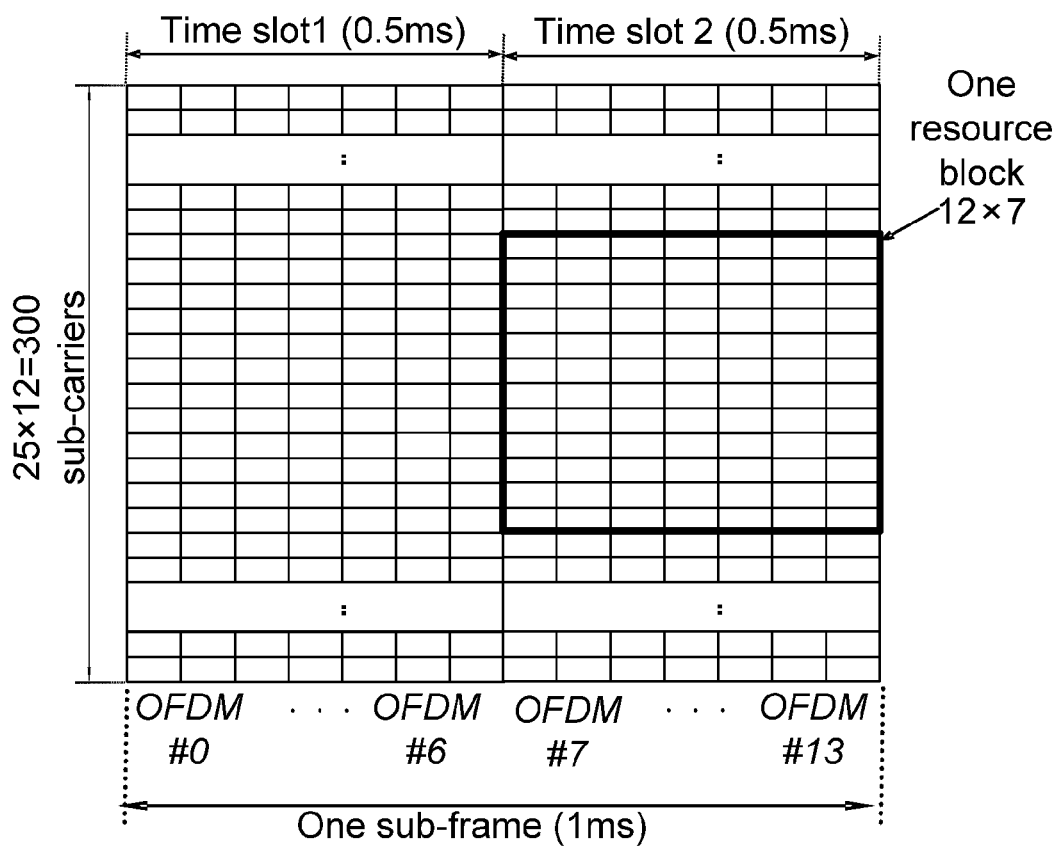
FIG. 5 is an illustration of a resource block RB in a 3GPP LTE system with a 5M bandwidth.

The advantages and features of the present invention are illustrated in an actual example of a 3GPP LTE system with a 5M bandwidth with reference to FIG. 5. The 5M-bandwidth uplink in the LTE system contains a total of 512 sub-carriers, wherein the 300 sub-carriers in the middle are usable; each resource block contains 12 continuous sub-carriers, therefore a 5M bandwidth contains a total of 25 resource blocks.

The LTE uplink multiple access method adopts the DFT-s-OFDMA technique, in order to maintain the single carrier features, it is required that the number of carriers allocated to each user equipment must be continuous, i.e. requiring that the resource blocks allocated to each user equipment must be continuous; now the formula provided in the present invention is used to generate the continuous resource allocation signaling, there are a total of 25(25+1)/2=325 allocation cases for resource blocks, because the overhead of the resource allocation signaling according to the technical scheme of the present invention is $$\mathrm{ceil}\left(\log_2 \frac{N \cdot (N+1)}{2}\right) = \mathrm{ceil}\left(\log_2 \frac{25(25+1)}{2}\right) = 9 \text{ bits.}$$

Firstly, suppose that the number of continuous resource blocks allocated to a user equipment is 14 and that the logical index number of its starting resource block is 10, then the process of calculating the value RIV of the resource allocation signaling of the user equipment is as below:

because $(14-1) > \lfloor 25/2 \rfloor$, $RIV = 25 \times (25-14+1) + (25-1-10) = 314$, the corresponding binary resource allocation signaling generated according to the obtained RIV is 100111010.

If the existing tree-based resource allocation scheme is adopted, then the process of calculating the value RIV of the resource allocation signaling of the user equipment is as below:

$RIV = 25 \times (14-1) + 10 = 335$.

By comparison, the value of the continuous resource allocation signaling generated using the technical scheme of the present invention is more compact, when the signaling overhead exactly covers all allocation cases, the continuous resource allocation signaling generated according to the present invention can be more reasonable, and can avoid the problem in existing technologies that the actual overhead may exceed the predetermined value.

Of course, the present invention may also have many other embodiments, without departing from the spirit and substance of the present invention, those of skills familiar with the art can make various relevant modifications and variations based on the present invention, but these relevant modifications and variations shall all fall within the scope of protection of the claims attached with the present invention.

INDUSTRIAL APPLICABILITY

The present invention provides methods and apparatuses for generating and parsing continuous resource allocation signaling, when the signaling overhead exactly covers all allocation cases, the continuous resource allocation signaling generated according to the present invention can be more reasonable, and it can avoid the problem in existing technologies that the actual overhead may exceed the predetermined value, and ensures that the actual overhead of resource allocation signaling is $$\mathrm{ceil}\left(\log_2 \frac{N \cdot (N+1)}{2}\right)$$

and the value of the continuous resource allocation signaling generated is more compact.

What is claimed is:

1. A method for generating continuous resource allocation signaling, comprising the following steps:
   step S01, a sender determining a value of a parameter $N_{RB}$ according to the total number of resources in a system and determining, according to the amount and location of the total resources occupied by continuous resources allocated to a target user equipment, values of parameters $L_{CRBs}$ and $RB_{start}$,
   wherein, the $N_{RB}$ denotes the total number of resource blocks in the system, the $L_{CRBs}$ denotes the number of continuous resource blocks allocated to the user equipment, and the $RB_{start}$ denotes an index number of a starting resource block in the continuous resource blocks allocated to the user equipment;
   step S02, the sender comparing $L_{CRBs} - 1$ with $\lfloor N_{RB}/2 \rfloor$ to compute a first value of resource allocation signaling of the user equipment,
   if the $L_{CRBs} - 1$ is greater than the $\lfloor N_{RB}/2 \rfloor$, then the first value is $N_{RB}(N_{RB} - L_{CRBs} + 1) + (N_{RB} - 1 - RB_{start})$ or $N_{RB} \times N_{RB} - N_{RB} \times L_{CRBs} + N_{RB} \times 2 - 1 - RB_{start}$, else, the first value is $N_{RB}(L_{CRBs} - 1) + RB_{start}$; and
   step S03, the resource allocation signaling of the target user equipment being generated according to the first value and transmitted.

2. The method according to claim 1, wherein, the step S03 is intended to convert the first value of the resource allocation signaling from a decimal number to a binary number so as to generate the resource allocation signaling of the target user equipment.

3. An apparatus for generating continuous resource allocation signaling, residing on a sender, comprising:
a parameter value determination and calculation unit, which is used to determine a value of a parameter $N_{RB}$ according to the total number of resources in a system and to determine, according to the amount and location of the total resources occupied by continuous resources allocated to a target user equipment, values of parameters $L_{CRBs}$ and $RB_{start}$, to compute values of $L_{CRBs}-1$ and $\lfloor N_{RB}/2 \rfloor$ and to transmit the computed values along with the parameter values to a comparison unit, wherein the $N_{RB}$ denotes the total number of resource blocks in the system, the $L_{CRBs}$ denotes the number of continuous resource blocks allocated to the user equipment, and the $RB_{start}$ denotes an index number of a starting resource block in the continuous resource blocks allocated to the user equipment;
the comparison unit, which is used to compare the $L_{CRBs}-1$ with the $\lfloor N_{RB}/2 \rfloor$, and to transmit the result of the comparison along with the parameter values to a calculation unit;
the calculation unit, which is used to calculate a first value of resource allocation signaling of the user equipment according to the result of the comparison and by using a relevant formula, and to transmit the calculated RIV to a resource allocation signaling transmission unit, wherein the calculation method is configured as below:
if the result of the comparison shows the $L_{CRBs}-1$ is greater than the $\lfloor N_{RB}/2 \rfloor$, then the first value of the resource allocation signaling is $$N_{RB}(N_{RB}-L_{CRBs}+1)+(N_{RB}-1-RB_{start}) \text{ or } N_{RB} \times N_{RB} - N_{RB} \times L_{CRBs}+N_{RB} \times 2-1-RB_{start};$$

else, the first value is $N_{RB}(L_{CRBs}-1)+RB_{start}$; and
the resource allocation signaling transmission unit, which is used to generate the resource allocation signaling of the target user equipment according to the first value of the resource allocation signaling obtained via calculation and to transmit it.

4. The apparatus according to claim 3, wherein, the resource allocation signaling transmission unit is also used to convert the first value of the resource allocation signaling from a decimal number to a binary number so as to generate the resource allocation signaling of the target user equipment.

5. A method for parsing continuous resource allocation signaling, comprising the following steps:
step S11, a user equipment receiving resource allocation signaling sent to it from a sender and obtaining a first value of the resource allocation signaling;
step S12, comparing $$\left\lfloor \frac{RIV}{N_{RB}} \right\rfloor + 1 + RIV \bmod N_{RB}$$

with $N_{RB}$, where RIV is the first value, if the $$\left\lfloor \frac{RIV}{N_{RB}} \right\rfloor + 1 + RIV \bmod N_{RB}$$

is greater than the $N_{RB}$, then the number of continuous resource blocks allocated to the user equipment $L_{CRBs}$ is $$N_{RB} + 2 - \left( \left\lfloor \frac{RIV}{N_{RB}} \right\rfloor + 1 \right),$$

and an index number of a starting resource block $RB_{start}$ is $N_{RB}-1-RIV \bmod N_{RB}$,
else, the $L_{CRBs}$ is $$\left\lfloor \frac{RIV}{N_{RB}} \right\rfloor + 1,$$

and the $RB_{start}$ is $RIV \bmod N_{RB}$,
wherein, the $N_{RB}$ denotes the total number of resource blocks in a system, the $L_{CRBs}$ denotes the number of continuous resource blocks allocated to the user equipment, and the $RB_{start}$ denotes the index number of the starting resource block in the continuous resource blocks allocated to the user equipment; and
step S13, the user equipment acquiring, according to the values of $L_{CRBs}$ and $RB_{start}$, the amount and location of the total resources occupied by the continuous resources allocated to itself.

6. The method according to claim 5, wherein, in the step S11, the user equipment detects out its own resource allocation signaling from the sender's transmitted data, and converts the resource allocation signaling received from a binary number to a decimal number so as to obtain the first value of the resource allocation signaling.

7. An apparatus for parsing continuous resource allocation signaling, residing on a user equipment, comprising:
a resource allocation signaling receiving unit, which is used to receive resource allocation signaling that a sender sends to the user equipment, and to transmit a first value of the resource allocation signaling obtained from the signaling to a parameter value determination and calculation unit;
the parameter value determination and calculation unit, which is used to determine a value of a parameter $N_{RB}$ according to the total number of resources in a system and to calculate values of $$\left\lfloor \frac{RIV}{N_{RB}} \right\rfloor + 1$$

and $RIV \bmod N_{RB}$, and to transmit the computed result and the value of $N_{RB}$ to a comparison unit, wherein, the $N_{RB}$ denotes the total number of resource blocks in the system, where RIV is the first value;
the comparison unit, which is used to compare the $$\left\lfloor \frac{RIV}{N_{RB}} \right\rfloor + 1 + RIV \bmod N_{RB}$$

with the $N_{RB}$, and to transmit the result of the comparison along with the parameter values to a calculation unit;
the calculation unit, which is used to calculate the number of continuous resource blocks allocated to the user equipment $L_{CRBs}$ and an index number of a starting resource block $RB_{start}$ according to the result of the comparison and by using a relevant formula, and to transmit the computed result to a resource allocation information acquisition unit, wherein the calculation method is configured as below:

if the $$\left\lfloor \frac{RIV}{N_{RB}} \right\rfloor + 1 + RIV \bmod N_{RB}$$

is greater than the $N_{RB}$, then the $L_{CRBs}$ is $$N_{RB} + 2 - \left(\left\lfloor \frac{RIV}{N_{RB}} \right\rfloor + 1\right),$$

and the $RB_{start}$ is $N_{RB}-1-RIV \bmod N_{RB}$, else, the $L_{CRBs}$ is $$\left\lfloor \frac{RIV}{N_{RB}} \right\rfloor + 1,$$

and the $RB_{start}$ is $RIV \bmod N_{RB}$; and the resource allocation information acquisition unit, which is used to acquire the amount and location of the total resources occupied by the continuous resources allocated to the user equipment according to the values of $L_{CRBs}$ and $RB_{start}$.

8. The apparatus according to claim 7, wherein, the resource allocation signaling receiving unit is also used to convert the received resource allocation signaling from a binary number to a decimal number so as to obtain the first value of the resource allocation signaling.

* * * * *